United States Patent [19]

Lehmann et al.

[11] Patent Number: 4,957,751

[45] Date of Patent: Sep. 18, 1990

[54] METHOD OF PRODUCING RENNET CHEESE FROM RAW MILK

[75] Inventors: Hanno Lehmann; Iloi Wasen, both of Oelde, Fed. Rep. of Germany; Hubert Pointurier, Paris, France

[73] Assignee: Westfalia Separator AG, Oelde, Fed. Rep. of Germany

[21] Appl. No.: 377,511

[22] Filed: Jul. 10, 1989

[30] Foreign Application Priority Data

Jul. 16, 1988 [DE] Fed. Rep. of Germany ....... 3824167

[51] Int. Cl.$^5$ .................. A23C 19/00; A23C 19/05
[52] U.S. Cl. ........................................ 426/36; 426/39; 426/40; 426/41; 426/491; 426/74
[58] Field of Search ............... 426/36, 38, 39, 40, 426/41, 42, 43, 74, 657, 491, 495

[56] References Cited

U.S. PATENT DOCUMENTS

| | | | |
|---|---|---|---|
| 3,887,718 | 6/1975 | Hinds, Jr. | 426/491 |
| 4,001,198 | 1/1977 | Thomas | 426/491 |
| 4,036,999 | 7/1977 | Grindstaff | 426/41 |
| 4,372,979 | 2/1983 | Reinbold et al. | 426/36 |

Primary Examiner—Marianne Cintins

[57] ABSTRACT

A method of producing rennet cheese from raw milk, wherein raw milk is standardized, a biological reaction is terminated, a precipitant and cultures are added, cheese mass is separated from whey, and denatured cheese fines are removed from the whey by separation or decantation. The cheese fines are biologically acidified in whey or water, the denatured proteins are removed from the whey or water, the denatured proteins are removed from the whey by separation or decantation, whereby the major proportion of the detrimental calcium is removed along with the separated liquid, the fines are suspended in water or whey, the suspension is warmed for 5 to 10 minutes at 40° to 60° C., the pH is adjusted to form 6.5 to 7.0 and with a 10% neutralization agent, the material is heated to from 80° to 90° C. for 1 to 5 minutes, and the product is returned to the raw milk or added to other dairy products to increase the protein content or the proportion of dry mass.

8 Claims, 1 Drawing Sheet

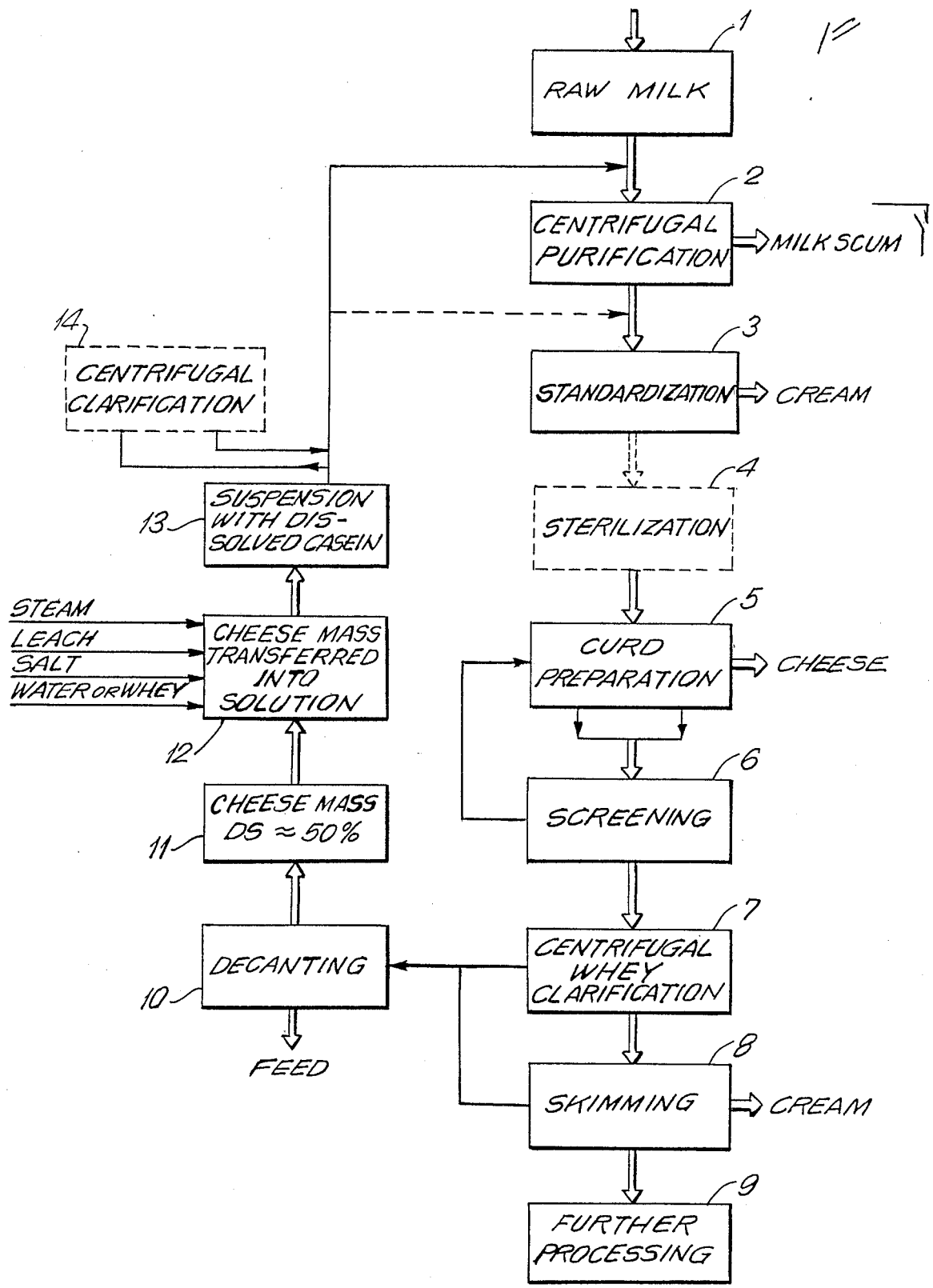

METHOD OF PRODUCING RENNET CHEESE FROM RAW MILK

BACKGROUND OF THE INVENTION

The invention concerns a method of producing rennet cheese from raw milk, wherein the milk can be purified with respect to internal and external contamination, standardized and delivered to the cheesemakers and wherein a biological reaction is terminated, a precipitant and cultures are added, and the cheese mass is separated from whey that contains cheese fines.

Denatured cheese fines (powdered casein) can be removed from the whey by separation or decantation.

The raw whey is introduced into a stack of disks in a clarifying separator at a point of powerful centrifugal force. The cheese fines are separated out and collect in a double-conical solids space of the separator. The fines are extracted in a concentrated and exploitable form by completely or incompletely emptying the separator in accordance with how much fines occur.

In the previously known methods of producing rennet cheese, the cheese fines are a true waste product whereas the clarified whey is intended for further processing.

In some cases the cheese fines are further processed into processed cheese or sold to processed-cheese factories. When such a procedure is not possible, the fines are usually released for use in animal feeds.

Large volumes of cheese fines are needed for economical further processing for the aforesaid conventional purposes. By the time enough fines have been collected, refrigeration, intermediate storage, and packaging have resulted in high costs. The quality of the fines is negatively affected by storage.

The producer can seldom command a decent price when reselling because the market trend is downward.

The production of rennet cheese results in cheese fines that contain so much calcium as to be impossible to reliquify without adding emulsifying salts. The calcium ($Ca^{++}$) creates bridges between the casein micelles and accordingly impedes reliquification. Although the emulsifying salts do bond the $Ca^{++}$ components enough to allow reliquification, the salts remain in the product and make it impossible to use the cheese fines even for producing processed cheese.

SUMMARY OF THE INvENTION

The object of the invention is to improve the aforesaid method to the extent that the cheese fines that precipitate out of the whey need not be separated out as a waste product and can be returned to production and mixed with the milk or added to other dairy products to increase the protein content or the proportion of dry mass.

This object is attained in accordance with the invention in a method of producing rennet cheese from raw milk, wherein the cheese fines are biologically acidified (with lactic acid or cultures) in whey or water, the denatured proteins are removed from the whey by separation or decantation, wherein the major proportion of the detrimental calcium is removed along with the separated liquid, the fines are suspended in water or whey and preferably in water, the suspension is warmed for 5 to 10 minutes at 40° to 60° C. and preferably 50° C., the pH is adjusted to from 6.5 to 7.0 and preferably to 6.8 with a 10% neutralization agent, the material is heated to from 80° to 90° C. for 1 to 5 minutes, and the product is returned to the raw milk or added to other dairy products to increase the protein content or the proportion of dry mass.

The object is also attained in a method of producing rennet cheese from raw milk, wherein the cheese fines in the whey are biologically acidified (with lactic acid or cultures), the denatured proteins are removed from the whey by separation or decantation, wherein the major proportion of the detrimental calcium is removed along with the separated liquid, the fines are suspended in water or whey and preferably in water, the suspension is warmed for 5 to 10 minutes at 40° to 60° C. and preferably 50° C., the pH is adjusted to from 6.5 to 7.0 and preferably to 6.8 with a 10% neutralization agent, the material is heated to from 80° to 90° C. for 1 to 5 minutes, and the product is returned to the raw milk or added to other dairy products to increase the protein content or the proportion of dry mass.

The reliquified cheese fines can be clarified in a clarifying separator before being mixed with a medium, milk or dairy products for example.

The heating can occur in extruders or scraper heaters or in double-walled containers with mixers.

A salt that contains a phosphate can be added. Between 0.1 and 1.0 g of $Na_2HPO_4$ can be added.

Since the reliquified cheese fines can be clarified, all contaminants can be separated out.

The method in accordance with the invention makes it possible to remove the $Ca^{++}$ components without adding emulsifying salts. The biological acidification dissolves most of the calcium, which is removed in the subsequent step along with the separated liquid. The cheese fines are then, with the calcium removed, mixed in the third step with a low-calcium solution, the most preferable being water in that the calcium content of milk or whey can still cause problems.

Reliquifying the cheese fines in water or whey results in a final product with a dry mass of approximately 15%. The final product will accordingly have a consistency appropriate for further processing or clarification and mixing with other products. When whey is used instead of water, constituents of the whey are exploited to create bonds between the fines and the liquid phase and improve the stability of the reliquified fines in solution.

The warming is preferably carried out at 50° for 5 to 10 minutes. Its purpose is to ensure satisfactory thermal activity and a sufficient reaction time.

The pH is adjusted to preferably 6.8 with a 10% neutralization agent. Since the final pH is accordingly similar to that of fresh dairy products, the product is appropriate for any type of further processing.

The 10% neutralization agent prevents scorching phenomena during neutralization.

The heating to 80° to 90° for 1 to 5 minutes ensures in conjunction with the ideal pH that the cheese fines will dissolve well. Also attained is a good bacteriological quality without the casein being chemically or physically attacked.

If the heating is carried out in an extruder, it can be carried out under high pressure. The reaction time is conditional. If the heating is carried out in a scraper heater, the product must be heated in conjunction with a reaction time.

BRIEF DESCRIPTION OF THE DRAWING

The various stages of the method of producing rennet cheese from raw milk at an increased yield in the cheesemaking process by reliquifying the cheese fines that occur are illustrated in the Figure which is a flow chart.

DETAILED DESCRIPTION OF THE INVENTION

Raw milk is received in block 1 and is subjected to centrifugal purification in block 2 with the milk sludge being outputted. The remaining product is standardized in block 3, which means that cream is removed to obtain the standard milk to cream mixture. The standardized milk is optionally clarified from bacteria by centrifuge in block 4 with the resulting product applied to block 5 wherein the curd preparation takes place and wherein the cheese is outputted. The resulting whey containing cheese particles are applied to block 6 wherein screening occurs and the separated cheese particles are recirculated to block 5. The remaining whey is applied to block 7 wherein centrifugal clarification takes place and block 8 where skimming takes place so that cream is removed at block 8 and the cheese fines from blocks 7 and 8 are applied to block 10. The clarified and skimmed whey is fed to block 9 wherein further processing takes place.

At block 10, the cheese fines are further concentrated to a cheese mass of approximately 50% DS (as indicated in block 11). The separated liquid is used as feed.

Block 12 represents reliquifying the fines into a dissolved form and block 13 has the resulting suspension with the casein in solution. When the stage represented by block 2 is included, the suspension is added to the cheese and milk upstream of the purification block 2 and otherwise prior to block 3. In this latter case, the suspension is centrifugally clarified in block 14.

It will be appreciated that the instant specification and claims are set forth by way of illustration and not limitation, and that various modifications and changes may be made without departing from the spirit and scope of the present invention.

What is claimed is:

1. In a method of producing rennet cheese from raw milk, wherein raw milk is standardized, a precipitant and cultures are added to initiate a biological reaction, and after termination of the biological reaction, cheese mass is separated from whey, and denatured cheese fines are removed from the whey by separation or decantation, the improvement wherein the cheese fines are biologically acidified in whey or water, denatured proteins are removed from the whey by separation or decantation, whereby detrimental calcium is removed along with the separated liquid, the cheese fines are suspended in water or whey, the suspension is warmed for 5 to 10 minutes at 40° to 60 ° C., the pH is adjusted to form 6.5 to 7.0 and with a 10% neutralization agent to form a material, the material is heated to form 80° to 90° C. for 1 to 5 minutes to form a product, and the product is returned to the raw milk before it is standardized or it is removed.

2. In a method of producing rennet cheese from raw milk, wherein raw milk is standardized, a precipitant and cultures are added to initiate a biological reaction, and after termination of the biological reaction, cheese mass is separated from whey that contains cheese fines, the improvement wherein the cheese fines in the whey are biologically acidified, denatured proteins are removed from the whey be separation or decantation, whereby detrimental calcium is removed along with the separated liquid, the cheese fines are suspended in water or whey, the suspension is warmed for 5 to 10 minutes at 40° to 60° C., the pH is adjusted to from 6.5 to 7.0 with a 10% neutralization agent to form a material, the material is heated to from 80° to 90° C. for 1 to 5 minutes to form a product, and the product is returned to the raw milk before it is standardized or it is removed.

3. A method as in claim 1 or 2, wherein the product is clarified in a clarifying separator before it is returned to the raw milk or it is removed.

4. A method as in claim 1 or 2, wherein the heating comprises disposing the product in extruders or scraper heaters or in double-walled containers with mixers.

5. A method as in claim 1 or 2, wherein salt that contains a phosphate is added.

6. A method as in claim 5, wherein between 0.1 and 1.0 g of $Na_2HPO_4$.

7. A method as in claim 1 or 2, wherein the suspension is warmed to 50° C.

8. A method as in claims 1 or 2, wherein the pH is adjusted to 6.8.

* * * * *